Feb. 16, 1943.    M. O. MARSH    2,311,450
TRANSFORMER
Filed April 23, 1940
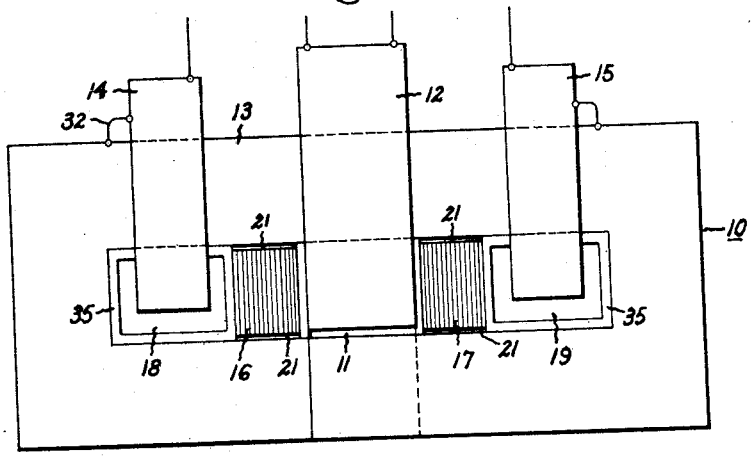
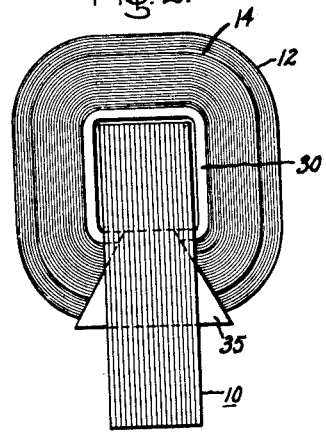
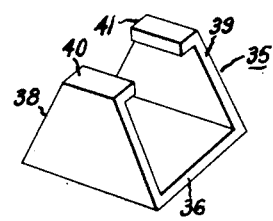
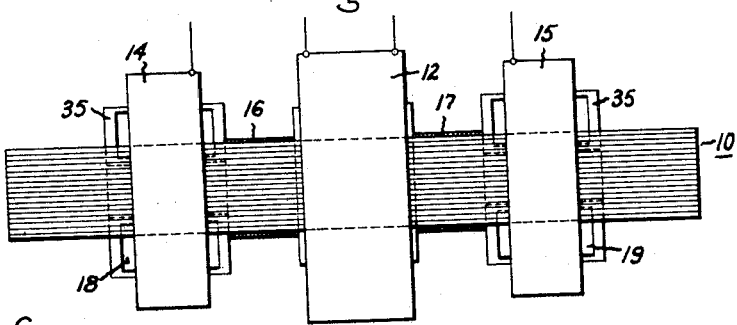
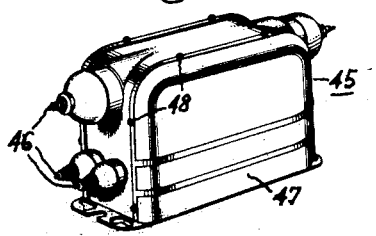
Inventor:
Myrle O. Marsh,
by Harry E. Dunham
His Attorney.

Patented Feb. 16, 1943

2,311,450

UNITED STATES PATENT OFFICE 2,311,450

TRANSFORMER

Myrle O. Marsh, Fort Wayne, Ind., assignor to General Electric Company, a corporation of New York Application April 23, 1940, Serial No. 331,146

5 Claims. (Cl. 175—356)

This invention relates to improvements in transformers and while it is not necessarily limited thereto, it is particularly adaptable to transformers designed for operating high potential luminous tubes such as the neon type.

Certain types of luminous tubes require a high initial voltage in order to ionize the included gas and to overcome the drop at the electrode in each end thereof. Because of the inherent negative resistance characteristics of such tubes, the current flowing therein must be limited following the initial starting in order to prevent damage to the tubes. Suitable current limitation is obtained by using transformers having high inherent reactance. In the case of neon tubes suppose the ionizing potential is of the order of 15,000 volts, a common value, then in order that the high voltage circuit need not be insulated for this voltage above ground, it is desirable that the midpoint of the transformer secondary be grounded so that the insulation stress on the secondary coils is reduced to 7,500 volts maximum to ground. The secondary winding of the transformer may be divided into two separate coils with the bottom layer of each coil connected together which connection may constitute the midpoint. This connection may in turn be connected to the magnetic core structure of the transformer so that the bottom layers of the two secondary coils immediately adjacent to the core will be at substantially ground potential and accordingly may be very easily insulated. The voltage across the coil increases progressively from the core until at the outer layer a maximum potential of 7,500 volts above ground is reached.

While luminous tube transformers are generally designed to operate indefinitely with the secondary winding either open or short circuited, they are nevertheless inadvertently and frequently overloaded by the user so that the secondary windings must be insulated for voltages much higher than this value. Theoretically, if the load circuit is ungrounded, the 60-cycle components of current are equal in the two secondary coils solely by virtue of the fact that they are in series. Under actual operating conditions, however, the division of load voltages between the two secondary coils may be either balanced or unbalanced depending upon the ratio of the relative total capacities to ground of the two secondary coils, attendant high voltage cables connecting the transformer and load, and the transformer load. Thus a voltage higher than open circuit voltage may result when the total capacity to ground of one high voltage coil circuit is greater than the other high voltage coil circuit. The capacitance and reactance network to ground in each secondary coil circuit is such that the rate of rise of voltage generated by the coil having the greater capacity to ground is actually slowed down, and the secondary coil having the small capacity load to ground is speeded up and generates a high voltage before the combined voltages of the two coils in series become of sufficient value to equal the ionization potential of the tubing load. These phenomena give rise to excessive peak voltages. In addition, voltage higher than open circuit voltage may be obtained due to the fact that the tubing capacitance to ground and especially the cables, constitute a capacitance load of sufficient magnitude that when applied to a high reactance transformer produces the effect of negative regulation. The combination of the excessive peak voltages, which may amount to substantially double normal voltage, and the accompanying high frequency oscillations, impose a severe stress on the insulation of the transformer. For these reasons either of the secondary coils which are adapted normally to operate at 7,500 volts above ground may under certain circumstances be subjected to potentials in the neighborhood of double that amount.

It is an object of this invention to provide a transformer of the type described having a magnetic core structure, and a high voltage secondary winding extending through a window or windows thereof, the high voltage winding being insulated from the magnetic core structure in a new and improved manner so as to withstand extreme over voltage conditions and yet is low in manufacturing cost.

For a consideration of what I believe to be novel and my invention, attention is directed to the following description and the claims appended thereto.

In the drawing Fig. 1 is a side elevation of a transformer embodying my invention; Fig. 2 is an end view thereof; Fig. 3 is a top view thereof; Fig. 4 is a perspective view of a coil spacer embodied in the transformer; Fig. 5 is an enlarged sectional view through a portion of the transformer illustrating certain structural details thereof; and Fig. 6 is a perspective view of the completed transformer assembly.

Referring now to Fig. 1, the transformer as illustrated comprises a magnetic core 10 which is built up of a plurality of punched U-shaped laminations which are so stacked in an end to end relationship as to form a rectangular core-type core with an elongated window 11. A low voltage or primary winding 12 surrounds the winding leg 13 of the core and is centrally located as regards the opposite ends thereof. Two secondary winding coils 14 and 15 are arranged upon the winding leg 13 and are oppositely disposed as regards the primary winding 12. A pair of magnetic shunts 16 and 17 is arranged within the core window 11 on the opposite sides of the low voltage primary winding 12 and adjacent thereto, defining with the core individual windows 18 and 19 for the high voltage windings 14 and 15, respectively. The magnetic shunts 16 and 17 may be secured in position in any suitable manner and are spaced slightly from the core 10 by shims 21 of non-magnetic material providing a relatively high reluctance for the shunt paths.

The structural details of the high voltage winding coils are further illustrated in Fig. 5. These coils are preferably of the layer wound type such as may be economically produced upon semi-automatic multiple winding machines, as are commonly used in the art for construction of windings for transformers of the luminous tube type. The coil base or spool 30 comprises a length of rectangular insulation tubing equal to the width of the coil and has on opening slightly larger than the cross-section of the core leg 13. Upon the spool 30 are wound a plurality of conductor layers 31, the end of the inner layer being brought out for connection to the core 10 as indicated at 32. Because of the high ratio of voltage transformation required of this transformer, a large number of turns are necessitated but since the current flow is usually of the order of 30 milliamperes, the conductor is a relatively fine wire provided with an enamel insulating coating. The consecutive layers of conductor turns are separated by layers 33 of relatively thin insulating material such as paper sheets. As is well understood in the art of manufacture of multiple wound coils of this self-supporting type, the layers of paper insulation extend somewhat beyond the end turns of the conductor layers so that relatively small spaces 34 exist between the adjacent paper layers extending from the end conductor turns to the outer side of the coil.

In the case of transformers insulated according to previous practices, it was observed that breakdowns of the high voltage windings frequently occurred due to an arcover from the end turns of a conductor layer near the outer surface and at a relatively high potential above ground to an end turn near the core, or to the core itself. In some instances the breakdown of the insulation across the outer face of the coil was due to the presence of air pockets between wrappings provided around the coil, or between sheets of insulation and the sides of the coil. In other instances, the non-uniform dielectric characteristics of the consecutive layers of insulation adjacent the coil sides resulted in localized concentrations of dielectric flux which ultimately caused the deterioration and breakdown of the insulation.

In accordance with this invention, the individual windows 18 and 19 in the transformer core are substantially larger than the cross-section of the high voltage windings 14 and 15, respectively. The high voltage coils are centrally positioned within their respective windows by means of generally U-shaped spacer members 35, one of which is illustrated in greater detail in the perspective view Fig. 4. The spacer comprises a base portion 36 having a width somewhat greater than the width of the stack of laminations comprising the magnetic core 10 so that the opposite edges thereof extend somewhat outwardly from the core beneath the extremity of the high voltage windings extending through the core window, as is illustrated more clearly in Fig. 2. The creepage distance from the outer or high voltage layer of the coil to the core is thereby substantially increased. The two legs 38 and 39 are provided at their ends with inturned portions or inwardly projecting portions 40 and 41, respectively, the distance between these inturned portions being substantially equal to the width of the coil. The legs 38 and 39 are tapered toward their extremities so that the coil engaging portions 40 and 41 are of a width somewhat less than the thickness of the core. The outer dimensions of the spacers 35 are such that they fit relatively snugly into the individual windows 18 and 19 for the high voltage windings with the inturned flanges 40 and 41 engaging securely against the coils at portions adjacent to the core. Thus, the spacers are arranged within the windows relatively close to the core surface defining the windows so that they are spaced from the parts of the secondary winding portions within the windows and not contacted by the inwardly projecting portions 40 and 41. Furthermore, as will be seen in Fig. 5, the spacers engage with the windings at the innermost parts thereof or adjacent the innermost conductor layers, and the core with the winding leg positions the spacers so that they may in turn position the windings substantially centrally in the windows. These spacers when in place securely position the high voltage coils 14 and 15 so that during the ensuing treatment and assembly of the transformer the correct position of the high voltage coils will not be disturbed. While in the present modification I have illustrated the coil spacers 35 as being of an insulating material such as fiber or pressed paperboard, it is obvious that they may be formed of relatively thin metal because all portions thereof when assembled in position lie immediately against the magnetic portions of the transformer core structure.

With the transformer assembled as shown in Figs. 1, 2 and 3, it may then be arranged within a casing 45 and the various winding leads connected to the terminals 46. The casing is then filled with a suitable insulating compound having a relatively high dielectric strength such as air blown asphalt. This compound should have a relatively low viscosity at flow point to permit uniform filling of all spaces around and between the windings and core structure without formation of air pockets therein. It has been found advantageous to dip the core and coil assembly as shown in Fig. 1 in a suitable insulating varnish and then bake it before it is assembled in the case, and filled with the asphalt compound. While some improvement was noted in transformers so treated, it is not a step essential to the practice of the present invention. In Fig. 5 the filling of insulating compound in the core window 18 is indicated at 42. The insulating compound will flow into the spaces 34 between the adjacent layers 33 of paper insulation of the high voltage coils but even though these spaces may not be entirely filled, these spaces will be effectively sealed as regards communication between adjacent spaces. The distribution of the electric field between the high voltage end of the winding and ground is much more uniform, abrupt changes in the potential gradient are avoided, and the concentration of potential across air pockets which may be ionized is minimized. The compound should be of a type that when cool is semi-solid so that it will neither flow nor crack under any normal operating temperature of the transformer. The casing cover 47 may be fastened in place by any suitable means such as screws 48.

With the transformer constructed and insulated as described, the high voltage coils are entirely surrounded by a thick covering of insulating material having a uniform dielectric constant. This eliminates boundaries between dissimilar insulating materials and all surfaces which are likely to entrap air or moisture adjacent the surfaces of the coil.

With transformers constructed in accordance with previously known principles, failures due to overload breakdown were quite common so that the average life of such devices was relatively short. Since the adoption of the invention herein disclosed many thousand transformers have been constructed and have been placed into service without a single failure reported. During a severe laboratory life test of both conventional type transformers and of the new and improved type, as herein disclosed, the transformers were all connected to severely unbalanced loads and energized from a source of current at double normal voltage and double frequency. Such conditions of course were much more severe than any that would be encountered during normal use of a transformer, but they served to bring out to a remarkable extent the relative degree of improvement effected by the present invention. The average life obtained on this test from the conventional units was found to be six hours and 25 minutes with a maximum life obtained on one unit of 14 hours. The average life found for the transformers constructed in accordance with the instant disclosure was found to be in excess of 150 hours while the life recorded for several units was 360 hours, when the test was discontinued.

Having described the principle of operation of my invention together with the apparatus which I now consider to represent the best embodiment therof, I desire to have it understood that the specific arrangement shown is merely illustrative and that the invention may be carried out by other means.

What I claim as new and desire to secure by Letters Patent of the United States is:

1. A transformer having a magnetic core structure, a pair of secondary winding portions, a primary winding disposed between said secondary winding portions, said core structure including magnetic shunts arranged between said primary winding and each of said secondary winding portions defining individual windows for each of said windings, the cross-section of said secondary winding portions being substantially smaller than the corresponding window, spacer means having inwardly projecting means contacting only the opposite sides of said secondary winding portions adjacent the innermost parts thereof and the magnetic core structure for centrally positioning said secondary winding portions in the corresponding windows, said spacer means being arranged within the windows and spaced from the remaining parts of said secondary winding portions within the windows, and insulating compound completely filling the remaining space between said secondary winding portions and said spacer means and said core structure.

2. A transformer having a magnetic core structure defining a rectangular window, a high voltage winding surrounding a leg of said core and extending through said window, said high voltage winding comprising a plurality of concentric conductor layers separated by sheets of relatively thin fibrous insulation, the innermost conductor layer being at substantially core potential, spacer means engaging with said winding only adjacent said innermost conductor layer, means including said winding leg for positioning said spacer means for substantially centrally positioning said winding in said window, the opposite sides and outer surface of said winding being spaced from adjacent core portions, and a plastic insulating compound of relatively high dielectric strength surrounding the whole of said core and said winding, said compound substantially sealing over the edges of the insulation sheets on the opposite sides of said winding.

3. In a transformer having a magnetic core structure defining a rectangular window, a high voltage winding surrounding a leg of said core structure and extending through said window, the cross-sectional area of said coil being substantially smaller than said window, said coil comprising a plurality of concentric conductor layers separated by sheets of insulation of a width greater than the width of the conductor layers, insulating spacer means arranged within said window relatively close to the core surface defining the window for substantially centrally positioning said winding in said window, said spacer means having means adjacent said winding leg contacting said winding only adjacent said innermost layer, said spacer means being spaced from the remaining layers so as to provide a space across the entire outer surface of said winding, and a plastic insulating compound surrounding said winding and substantially sealing the spaces between the adjacent insulation sheets on the opposite sides of said winding.

4. A transformer having a magnetic core structure defining a window, a high voltage coil surrounding a leg of said core structure and extending through said window, the cross-sectional area of said coil being substantially smaller than said window, insulating spacer means arranged within said window relatively close to the core surface defining the window for centrally positioning said coil with regard to said window, said spacer means having means adjacent said coil winding leg contacting said coil only at the part thereof adjacent said winding leg, said spacer means being spaced from the remaining part of said coil whereby the opposite sides and outer surface of said coil are spaced from said spacer means and the adjacent portions of said core structure, and a plastic insulating compound of relatively high dielectric strength surrounding the whole of said core and said coil and completely filling the space therebetween.

5. A transformer having a magnetic core structure defining a window, a high voltage coil surrounding a leg of said core structure and extending through said window, the cross-sectional area of said coil being substantially smaller than said window, a spacer substantially centrally positioning said coil in said window, said spacer comprising a U-shaped member fitting snugly in said window, the legs of said spacer having inturned flanged portions engaging with the opposite sides of said winding adjacent said core structure.

MYRLE O. MARSH.